United States Patent [19]

Tajima et al.

[11] Patent Number: 4,914,361
[45] Date of Patent: Apr. 3, 1990

[54] METHOD AND APPARATUS FOR CONTROLLING THE SPEED OF MOVING BODY

[75] Inventors: Fumio Tajima, Ibaraki; Hiroshi Katayama; Kunio Miyashita, both of Hitachi; Seiichi Narushima, Ibaraki; Kouichi Saito, Kitaibaraki, all of Japan

[73] Assignee: Hitachi, Ltd., Tokyo, Japan

[21] Appl. No.: 362,239

[22] Filed: Jun. 6, 1989

[30] Foreign Application Priority Data

Jun. 6, 1988 [JP] Japan .................................. 63-137456
Dec. 10, 1988 [JP] Japan .................................. 63-312457

[51] Int. Cl.$^4$ ............................................. H02P 6/02
[52] U.S. Cl. ..................................... 318/254; 318/138
[58] Field of Search ................. 318/138, 254, 439; 388/802, 810, 811, 845

[56] References Cited

U.S. PATENT DOCUMENTS

| 4,223,261 | 9/1980 | White | 318/721 |
| 4,400,654 | 8/1983 | Elliott | 318/254 |
| 4,429,262 | 1/1984 | Utenick | 318/254 |
| 4,516,060 | 5/1985 | Guzik et al. | 388/811 |
| 4,680,515 | 7/1987 | Crook | 318/138 X |
| 4,736,143 | 4/1988 | Nakamura et al. | 388/810 X |
| 4,748,386 | 5/1988 | Nakamura et al. | 318/254 |

FOREIGN PATENT DOCUMENTS 55-79694 6/1980 Japan .

Primary Examiner—Bentsu Ro
Attorney, Agent, or Firm—Antonelli, Terry & Wands

[57] ABSTRACT

Disclosed is a speed controlling method and apparatus in which a suitable current or voltage command is given to a moving body on the basis of the relation between a speed detection signal obtained by detecting the speed of the moving body and an externally supplied speed command signal. The speed of the moving body is controlled in a manner so that the speed of the moving body is successively detected, a speed error which is a difference between a speed command value and a speed detection value is calculated whenever the speed of the moving body is detected, and the speed of the moving body is successively controlled on the basis of a driving signal obtained by an arithmetic operation on the basis of the speed error and a set control gain, and that, on the other hand, a present speed error quantity is calculated on the basis of speed errors obtained whenever the detection of the speed of the moving body have been carried out predetermined number of times, the speed error quantity obtained presently is compared with and the speed error quantity obtained last, and the set gain is corrected or updated in accordance with the result of comparison of the present and last speed error quantities to thereby minimize the speed error quantity.

46 Claims, 9 Drawing Sheets

METHOD AND APPARATUS FOR CONTROLLING THE SPEED OF MOVING BODY

BACKGROUND OF THE INVENTION

The present invention generally relates to a method and an apparatus for controlling the speed of a moving body, and particularly relates to a method and an apparatus for controlling the speed of a moving body suitable for use for controlled equipment which cannot be allowed to fluctuate in its speed in operation, such as, for example, a motor of a VTR (video tape recorder).

A VTR driving motor is desired to have a speed which can be kept constant. If a fluctuation in speed (such as irregular rotation, speed ripple, torque ripple) occurs in such a VTR driving motor, a picture is disturbed, so that reliability and quality required for the VTR deteriorate extremely. Although mainly DC motors have been used in such equipment conventionally, brushless motors the speed of which can be changed desirely and simply are often employed. A brushless motor has no mechanical brush, so that various problems due to abrasion or abrasion powder of a brush and/or a commutator do not occurs in the motor. In a brushless motor of the 120-degree current-conduction system, however, the number of flux interlinkage of a current-conducting coil varies depending on the position of a rotor to thereby cause a torque ripple and hence irregular rotation (speed fluctuation) in operation. Since this irregular rotation varies depending on the gain of a speed control system, it is possible to reduce the irregular rotation by making the gain of the speed control system larger.

If the gain of the speed control system is made too large, however, the speed control system becomes unstable enough to rather increase the irregular rotation. Although an optimum value of gain for reducing the irregular rotation exists in fact, the optimum value of gain in such a speed control system giving an influence on the irregular rotation is affected by a torque constant and/or a resistance of a motor, and further by a gain of an analog system if such an analog system is included in the speed control system. On the other hand, since the optimum value of gain varies depending on variations in temperature, in resistance values of used resistors, and so on, the optimum gain takes different values in individual control systems.

Under the above-mentioned circumstances, a conventional speed control system has been arranged such that the value of a control gain is selected so as not to make the speed control system unstable even under the worst conditions. In the case where a speed control apparatus is turned on under the condition of normal temperature or in the case where a speed control apparatus has no variations in resistance, however, there rather arises a disadvantage that irregular rotation may occur more or less.

JP-A-55-79694 discloses a motor control circuit wherein the control gain is changed in accordance with the position of the rotar, to reduce torque ripple.

SUMMARY OF THE INVENTION

It is therefore an object of the present invention to provide a method and an apparatus for controlling the speed of a moving body so that irregular rotation of the moving body can be reduced regardless of variations in temperature and in characteristics of the moving body.

In order to attain the above objects, according to an aspect of the present invention, the speed of the moving body is controlled in a manner so that the speed of the moving body is successively detected, a speed error which is a difference between a speed command value and a speed detection value is calculated whenever the speed of the moving body is detected, and the speed of the moving body is successively controlled on the basis of a driving signal obtained by an arithmetic operation on the basis of the speed error and a set control gain, and that, on the other hand, a present speed error quantity is calculated on the basis of speed errors obtained whenever the detection of the speed of the moving body have been carried out predetermined number of times, the speed error quantity obtained presently is compared with and the speed error quantity obtained last, and the set gain is corrected or updated in accordance with the result of comparison of the present and last speed error quantities to thereby minimize the speed error quantity.

In the above configuration, the present degree of irregular rotation is grasped by the speed error quantity obtained from a predetermined number of, preferably at least two, speed errors obtained previously, the present degree of irregular rotation is compared with the last degree of irregular rotation, and the set gain in the speed control system is changed on the basis of the result of comparison so that it is possible to drive the moving body continuously with the gain which minimize the irregular rotation of the moving body.

According to another aspect of the present invention, the speed of the moving body is controlled in a manner so that the speed of the moving body is successively detected, a speed error which is a difference between a speed command value and a speed detection value is calculated whenever the speed of the moving body is detected, and the speed of the moving body is successively controlled on the basis of a driving signal obtained by an arithmetic operation on the basis of the speed error and a set control gain, and that, on the other hand, a present speed error quantity is calculated on the basis of speed errors obtained whenever the detection of the speed of the moving body have been carried out predetermined number of times, the speed error quantity obtained presently is compared with the speed error quantity obtained last, and the set gain is corrected or updated in accordance with the result of comparison of the present and last speed error quantities, in which the above-mentioned speed error quantity is obtained from the components of the speed errors from which DC components and predetermined frequency components are removed. Preferably, the predetermined frequency is selected so as to be higher than one-tenth of the frequency for controlling the speed of the moving body to thereby provide an effect particularly in reduction of the speed error quantity in the VTR audio band.

DESCRIPTION OF THE PREFERRED EMBODIMENTS

An embodiment of the present invention will be described in detail with reference to the drawings.

Figure 1:
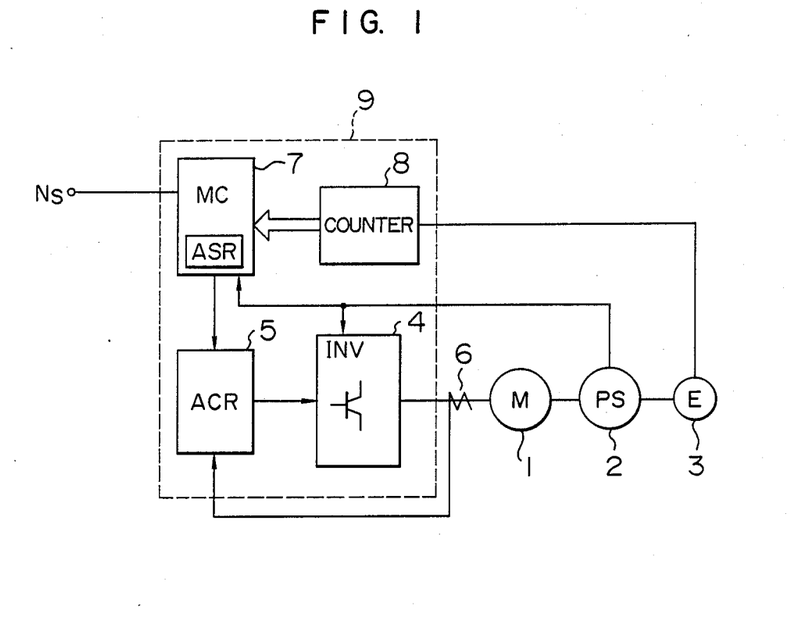
FIG. 1 is a basic block diagram of a speed control apparatus with which the control method according to the present invention is realized.

FIG. 1 is a basic block diagram illustrating an embodiment of the apparatus for controlling the speed of a moving body according to the present invention, in the case where the moving body is a brushless motor though the moving body is not always limited to a brushless motor but may be a motor provided with a brush. In FIG. 1, reference numeral 1 represents a brushless motor (M) as a moving body which may be either of the rotation type or of the linearly-going type (linear motor type). Reference numeral 2 represents a magnetic pole position sensor (PS) for detecting the position of a rotor of the motor 1. The sensor 2 is used for switching a phase current of the motor 1. Although the inside configuration of the motor 1 is not illustrated, the motor 1 has a structure that, like general brushless motors, the position of a rotor is detected electronically so as to make a current flow into two phase windings selected correspondingly to the position of the rotor. Reference numeral 3 represents a speed sensor (E) constituted by an encoder attached to a rotary shaft of the motor 1, and so on. Alternatively, the speed sensor 3 may be constituted by a frequency generator, a tachometer generator, a pulse generator, or the like.

Reference numeral 4 represents an inverter (INV) which acts as a driver for driving the motor 1. Generally, the inverter 4 is constituted by six switching elements connected to form three pairs of positive and negative arms for making a current flow into two selected phase windings and for changing the degree of the current. Reference numeral 5 represents an automatic current regulator (ACR) arranged to receive a current detection value obtained by a current transformer (CT) 6. Reference numeral 7 represents a microcomputer (MC) having a function which will be described later. Reference numeral 8 represents a speed detection circuit (COUNT), constituted by a counter in practice, for measuring pulse intervals of the encoder 3. In practice, the speed detection circuit 8 is constituted by a counter so as to count the number of reference pulses from a reference oscillator (not shown) which are inserted in each pulse interval of the encoder 3. Thus, the microcomputer 7 having a function as an automatic speed regulator (ASR), the automatic current regulator 5, the driver or inverter 4, and the speed detection circuit 8 constitute the main portion of a speed control apparatus 9.

The pulse-width information of the encoder 3 obtained by the speed detection circuit 8 is taken into the microcomputer 7 so as to be converted into an actual speed signal. The ASR of the microcomputer 7 acts to control the degree of a current command in accordance with a difference between the actual speed signal and a speed command signal $N_s$. An output signal from the magnetic pole position sensor 2 also is fed to the microcomputer 7 and the driver 4, so that the microcomputer 7 processes the output signal from the magnetic pole position sensor 2 to thereby perform the on/off control of the switching elements of the driver 4 and the control of the degree of current.

Figure 2:
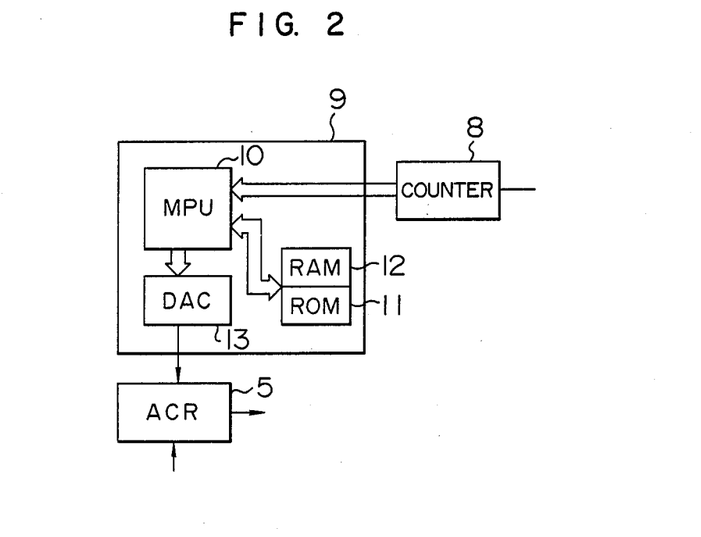
FIG. 2 is a diagram illustrating an example of the configuration of the microcomputer represented by the reference mark MC in FIG. 1.

FIG. 2 is a diagram illustrating an example of the configuration of the microcomputer 7 of FIG. 1. The microcomputer 7 is constituted by a microprocessing unit (MPU) 10 for fetching and processing the information obtained by the speed detection circuit 8, a read only memory (ROM) 11 for storing a program or the like, a random access memory (RAM) 12 for storing data or the like, and a digital-to-analog converter (DAC) 13, the output of the digital-to-analog converter 13 being applied to the automatic current regulator 5.

Figure 3:
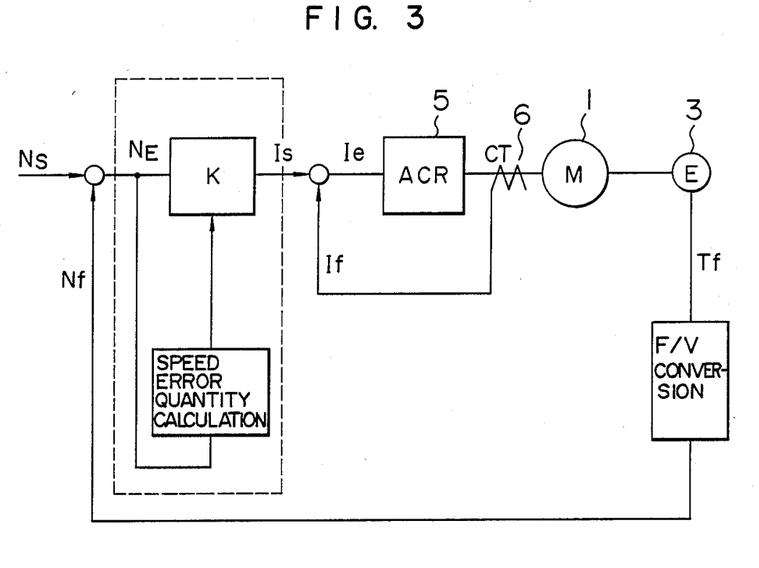
FIG. 3 is a diagram illustrating an embodiment of the present invention.

FIG. 3 is a block diagram illustrating an embodiment in the case where the present invention is applied to the variable gain control in the proportional control.

In FIG. 3, a synchronizing signal having a period $T_f$ of the pulses of the encoder 3 and obtained by counting the number of reference pulses of the reference oscillator inserted into the pulse interval of the speed sensor (encoder) 3 is taken into the microcomputer 7 so that an actual speed signal $N_f$ is obtained through $K/T_f$ operation (which is referred to as "F/V conversion" in FIG. 3), in which K represents a proportional gain of the control system. The microcomputer 7 calculates a speed error $N_E$ through software processing routine on the basis of a difference between the speed command signal $N_s$ and the actual speed signal $N_f$, and generates a new current command $I_s$ after proportional control processing (to which integration/differentiation is applied if necessary) of the speed error $N_E$. The automatic current regulator 5, which is a hardware configuration, calculates a current error $I_e$ on the basis of the current command $I_s$ and a current detection value $I_f$ obtained from the current transformer 6, so that the automatic current regulator 5 supplies a proper current to the motor 1. In FIG. 3, the illustration of a driver for the motor 1 is omitted.

Although the above-mentioned configuration is generally almost the same as that conventionally known, the feature of this embodiment lies in novel means for performing error calculation and for changing the proportional term gain K of the speed control system corresponding to the calculated speed error, as illustrated by a frame of broken line in FIG. 3.

Figure 4:
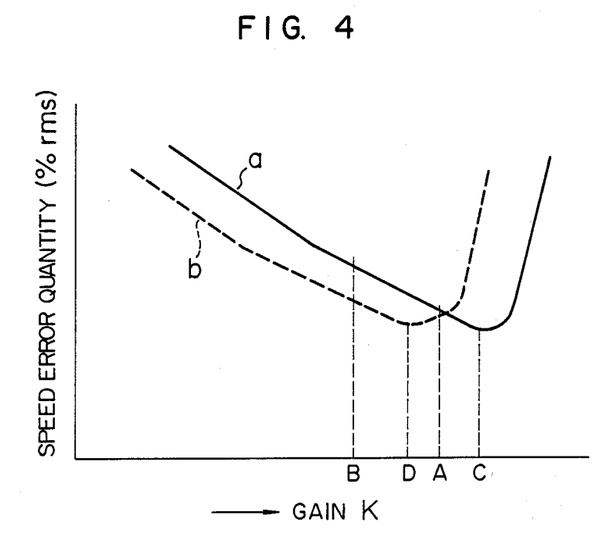
FIG. 4 is a diagram illustrating the relationship of irregular rotation of a motor versus a proportional gain of a microcomputer.

FIG. 4 is a diagram illustrating the relation of the irregular rotation (wow and flutter) of the motor 1 versus the gain K which is a proportional term. As seen in FIG. 4, the irregular rotation can be reduced by making the proportional gain K large. If the proportional gain K exceeds a predetermined value, however, the control system becomes unstable to oscillate so that the irregular rotation rather becomes large. In FIG. 4, a curve a shows a standard characteristic of control units and motors prepared by mass production which are the same kinds as the control apparatus and motor illustrated in this embodiment. Those control units and motors however include control units and motors which have a characteristic as shown in a curve b in the worst case due to the temperature characteristic of the control units and motors or due to variations in elements such as resistors because the automatic current regulator system is analog. In such a case, the worst product oscillates if the gain K which is a proportional term is set to a point A which is a set value for standard products (generally, the gain K is set not to an optimum value C but to the point A for the sake of some surplus). Accordingly, it is required to set the proportional term gain K to a point B at which even the worst product never oscillates. As a result, disadvantageously, irregular rotation rather increases in the standard products as a large majority having the characteristic of the curve a.

The novel means for performing error calculation and for changing the proportional term gain K of the speed control system corresponding to the calculated speed error, as illustrated by a frame of broken line in FIG. 3, can control a control unit such as an ACR or the like to operate a motor under the condition that irregular rotation is made small regardless of variations in devices having the characters of the curves a and b shown in FIG. 4.

That is, if irregular rotation (wow and flutter) can be grasped by the speed error calculation, it is possible to operate a motor at the lowest-wow-and-flutter point C or D regardless of the characteristic of the curve a or b in FIG. 4.

Figure 5:
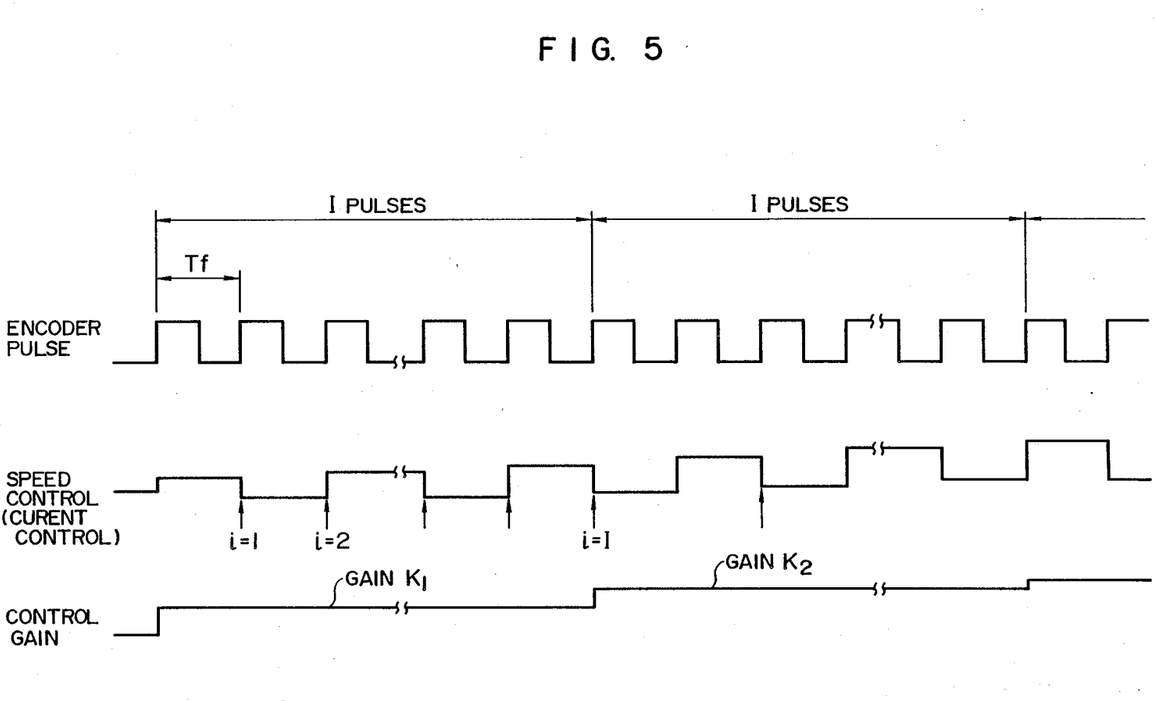
FIG. 5 is a diagram for explaining the control timing.

Referring to FIG. 5, the speed error calculation will be described.

Irregular rotation is caused by an AC component of the speed error $N_E$ which is a difference between the speed command signal $N_s$ and the speed signal $N_f$ calculated by the microcomputer 7. Assuming now that the speed control is performed at every pulse of the encoder 3 and the calculation of a speed error quantity (irregular rotation) is performed at every I pulses, the speed error quantity (irregular rotation) $W_F$ can be calculated by the following equation at every I pulses.

$$W_F = \frac{1}{I} \sum_{i=1}^{I} |N_E(i) - N_{av}| \quad (1)$$

That is, the speed error quantity (irregular rotation of the motor M) can be obtained as an average value of an AC component of the speed error $N_E$. In the equation, $N_{av}$ is an average value (DC component) of the speed error $N_E$, which can be obtained from the last I speed errors.

$$N_{av} = \frac{1}{I} \sum_{i=1}^{I} N_E(i) \quad (2)$$

This average value $N_{av}$ of the speed error $N_E$ is not zero in the case where control is being performed merely by proportional control in a stationary state, and the average value $N_{av}$ can be made almost zero by performing integral control.

Although FIG. 5 is illustrated on the assumption that the period $T_f$ of the encoder pulses is almost constant, the period $T_f$ varies correspondingly to the speed error in practice. Please note that FIG. 5 is a diagram for explanation of timings of encoder cycle fetching, speed control and control gain change but not for showing waveforms in an actual case.

Figure 6:
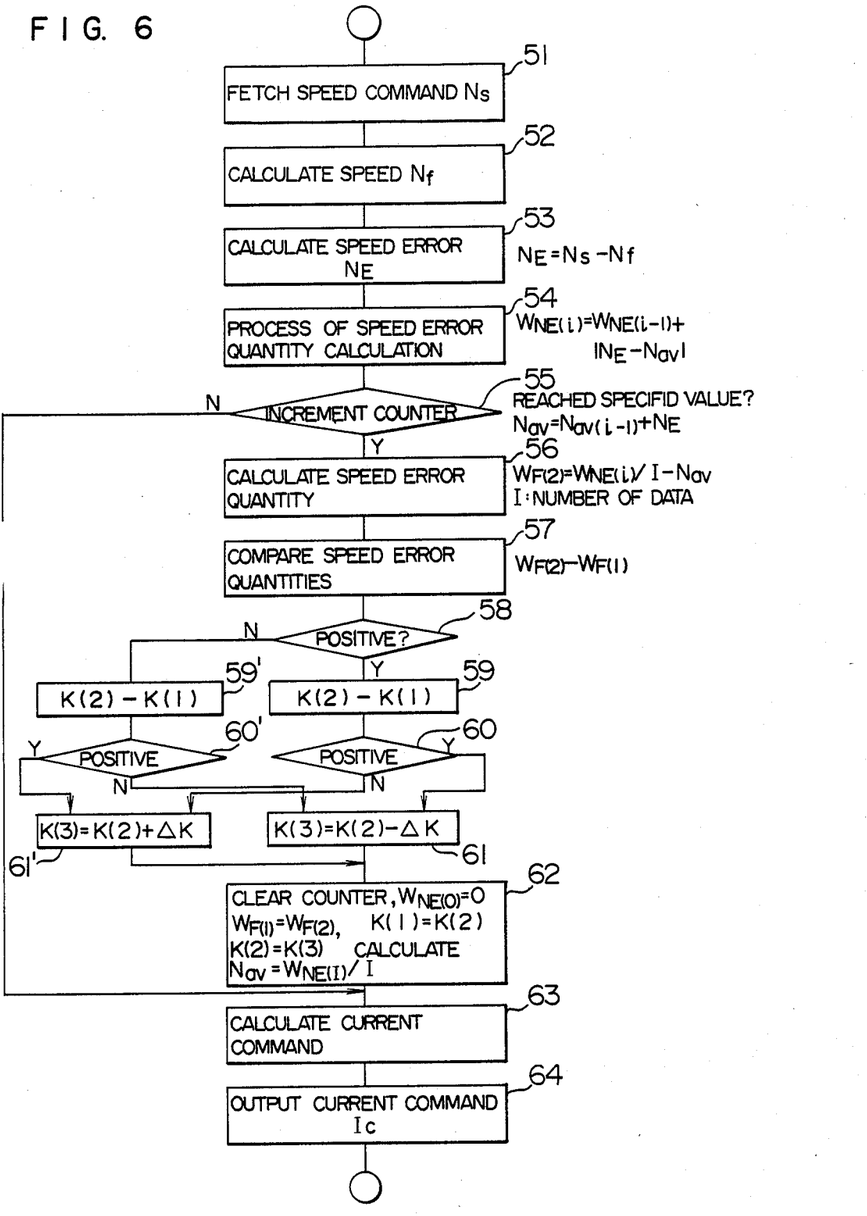
FIG. 6 is a flow chart illustrating another embodiment of the present invention.

FIG. 6 is a flow chart illustrating an example of the operation of the microcomputer 7 for realizing the above-mentioned means for calculation according to the present invention, in which one speed control operation is performed at every pulse interval of the encoder 3 (see FIG. 5). The microcomputer 7 fetches the speed command signal $N_s$ in a step 51, calculates the speed $N_f$ on the basis of the period $T_f$ of the encoder 3 in a step 52, and calculates the speed error $N_E$ ($N_E = N_s 31 N_f$) in a step 53. In a step 54, in order to calculate the speed error quantity on the basis of the equation (1), the microcomputer 7 performs the calculation $W_{NE}(i) = W_{NE}(i-1) |N_E - N_{av}|$ at every encoder pulse. That is, in this step 54, the microcomputer 7 calculates the accumulation $$W_{NE}(I) \left( = \sum_{i=1}^{I} |N_E(i) - N_{av}| \right)$$

of absolute values of changes of the respective speed errors $N_E$ at the points of time i = 1, 2, ..., I shown in FIG. 5. In a step 55, the microcomputer 7 judges whether the speed error calculation has been performed predetermined times or not. If the calculation has not been performed the predetermined times, the microcomputer 7 performs the calculation of a current command by a proportional term on the basis of the set gain $K_1$ and supplies the result of calculation to the automatic current regulator 5 at each point of time i in steps 63 and 64. If it is proved that the predetermined times has been reached in the step 55, the microcomputer 7 calculates the present speed error quantity (irregular rotation) $W_F(2)$ ($=W_{NE}(I)/I$) in a step 56. Moreover, in steps 57 and 58, the microcomputer 7 compares the present speed error quantity $W_F(2)$ with the last data $W_F(1)$, that is, calculates ($W_F(2) - W_F(1)$), and if it is proved that the speed error quantity has increased (corresponding to Y (yes)), the microcomputer 7 obtains a difference K(2) −K(1) between the last data K(1) and the present data K(2) of the proportional gain in a step 59, and judges whether the obtained difference is positive or not in a step 60. If the present data is larger than the last data, irregular rotation is going to increase and the microcomputer 7 makes the gain K(2) small by ΔK to thereby obtain a new gain K(3) in a step 61. If the present data is smaller than the last data, on the other hand, in steps 61' and 62, the microcomputer 7 makes the gain K(2) large by ΔK so as to make the gain agree with the optimum value at the operation point C or D in FIG. 4. If it is proved that the speed error quantity has decreased (corresponding to N (no)) in the step 58, on the other hand, the microcomputer 7 selects the gain toward the operation point C or D in FIG. 4 through steps 59', 60', 61 and 62, or 59', 60', 61' and 62. Through the abovementioned operation, it is possible to always operate the motor with the optimum gain. In a step 62, for the sake of the next calculation of speed error, processing such as resetting the counter, setting the value of $W_{NE}(0)$ to zero, storing the newly obtained $W_F(2)$, K(2) and K(3) as $W_F(1)$, K(1) and K(2) respectively, calculating $N_{av}(I)/I$ as $N_{av}$, and so on are performed.

It is preferable that the initial value of the proportional gain for the above-mentioned speed is set to the point B in FIG. 4. Although the state of rotation may be largely affected by a sudden disturbance, that is, the system is apt to become unstable so that there is possibility of oscillating at the points D and C at which irregular rotation is minimized, it is possible to make the irregular rotation small by returning the proportional gain to the initially set value when the speed error $N_E$ and the speed error quantity $W_F$ exceed predetermined values, or when the rate of change (differential coefficients) of the speed error $N_E$ and the speed error quantity $W_F$ exceed predetermined values. Thus, it is possible to provide a speed control apparatus which is safe and which is less in irregular rotation.

Although the speed error quantity $W_F$ is obtained through calculation of an average value as shown in the equation (1), an effective value or a peak hold value may be used. As to the $W_F$, it is also possible to practically use a value obtained by computing an arbitrarily dimensional harmonic component (having a switching period or a cogging-torque frequency as a fundamental frequency in a brushless motor) included in a speed error and produced in a specific rotation position by Fourier integral. That is, it is possible to use any quantity obtained as a function of irregular rotation from a speed error and a speed.

Next, referring to FIGS. 7 to 9, another embodiment of the present invention will be described. The circuit configuration of this embodiment is similar to that in the first-mentioned embodiment, except for the method of calculation of the speed error quantity.

Figure 7:
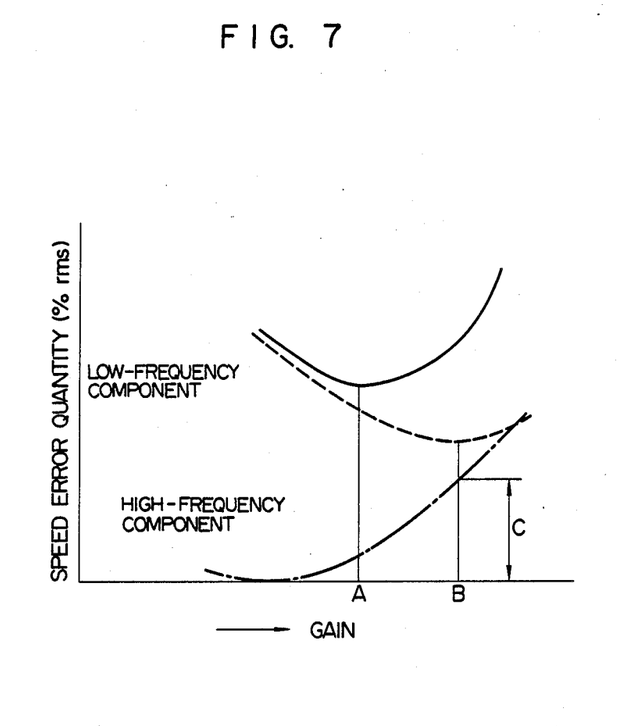
FIG. 7 is a diagram useful for explaining the present invention.

FIG. 7 shows causes of the speed error quantity $W_F$.

That is, FIG. 7 is a diagram illustrating high and low frequency components which cause the speed error quantity $W_F$. The speed error quantity $W_F$ can be divided into high and low frequency components as shown in FIG. 7. Particularly, the high frequency component is an unstable/oscillating phenomenon produced by making the gain large. The high frequency component means a frequency component above about a tenth of the frequency of pulses of the encoder, and the low frequency component means a frequency component not higher than that.

The smallest value of the speed error quantity $W_F$ calculated in accordance with the equation (1) is A in FIG. 7, and, generally, the effect of a high frequency component on the system is smaller than that of a low frequency component. It is therefore preferable to eliminate a high frequency component and operate at the point B at which the value of a low frequency component is minimized. For example, as to voice wow and flutter in a VTR shown in this embodiment, the above-mentioned effect of a high frequency component is much smaller than that of a low frequency component, and therefore the voice wow and flutter can be more improved if operation is performed at the point B.

Several methods can be considered in order make operation at the point B, that is, how to practically eliminating a high frequency component from a speed error quantity. Of those methods, one of the simplest methods is that in which an average of a plurality of speed errors the number of which is smaller than I is obtained and then the equation (1) is applied to the obtained average, as expressed as follows.

$$W_F = \frac{1}{M} \sum_{m=1}^{N} \left| \frac{1}{N} \sum_{n=1}^{N} (N \times (m-1) + n) - N_{av} \right| \quad (3)$$

Assume then that $M \times N = I$, and $N_E\{N \times (m-1) + n\}$ is the $\{N \times (m-1) + n\}$-th value of $N_E$. That is, in the case of obtaining a speed error quantity from I speed errors, at a first place, the average values $(1/N)$ $$\left\{ \sum_{n=1}^{N} N_E(N \times (m-1) = n) - N_{av} \right\}$$

are obtained with respect to N speed errors for them from 1 to M, and next, the absolute values of the obtained M average values are averaged to thereby eliminate a high frequency component, so that only a low frequency component appears. The value of N can be selected to the optimum one depending on a system.

Figure 8A:
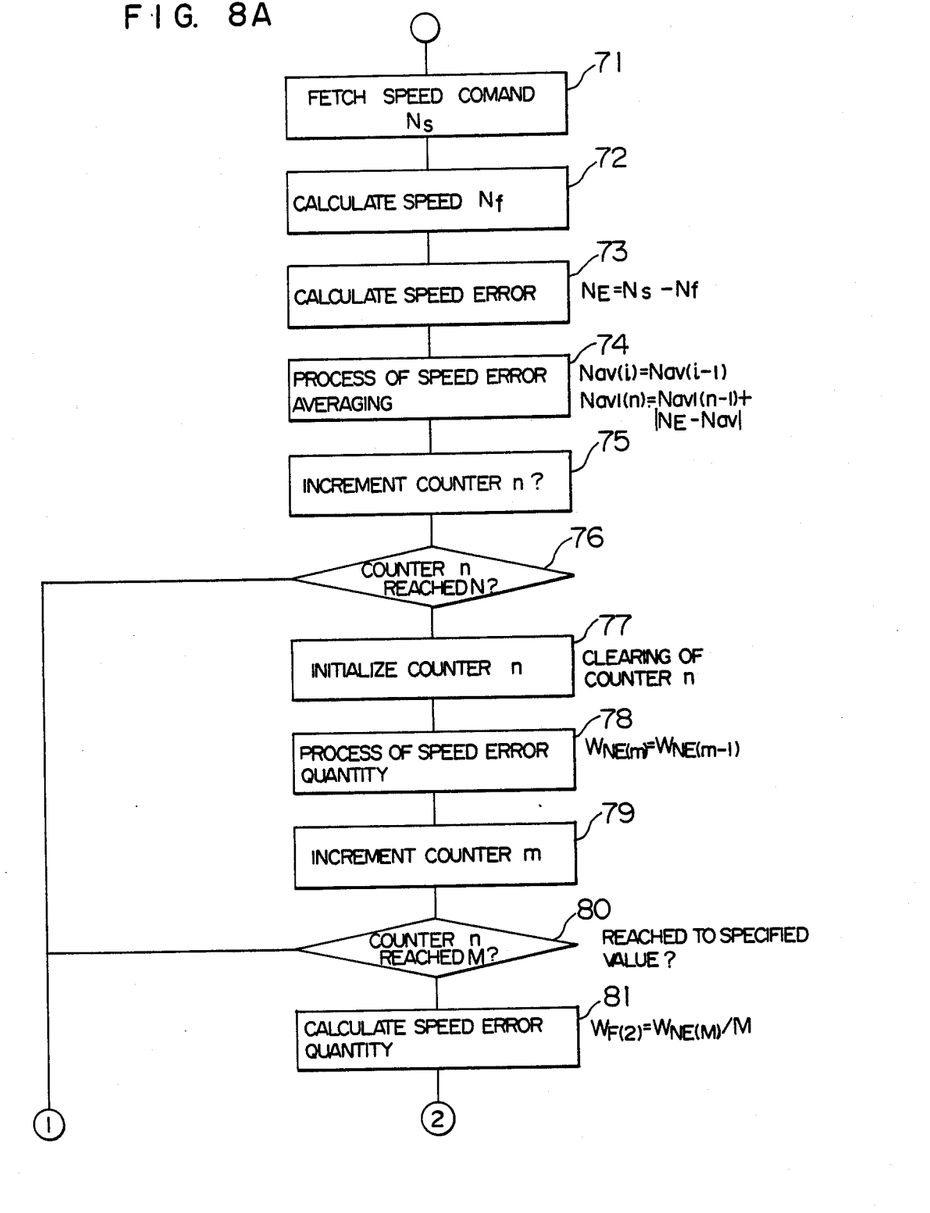
FIGS. 8A and 8B are diagrams illustrating another embodiment of the present invention.
Figure 8B:
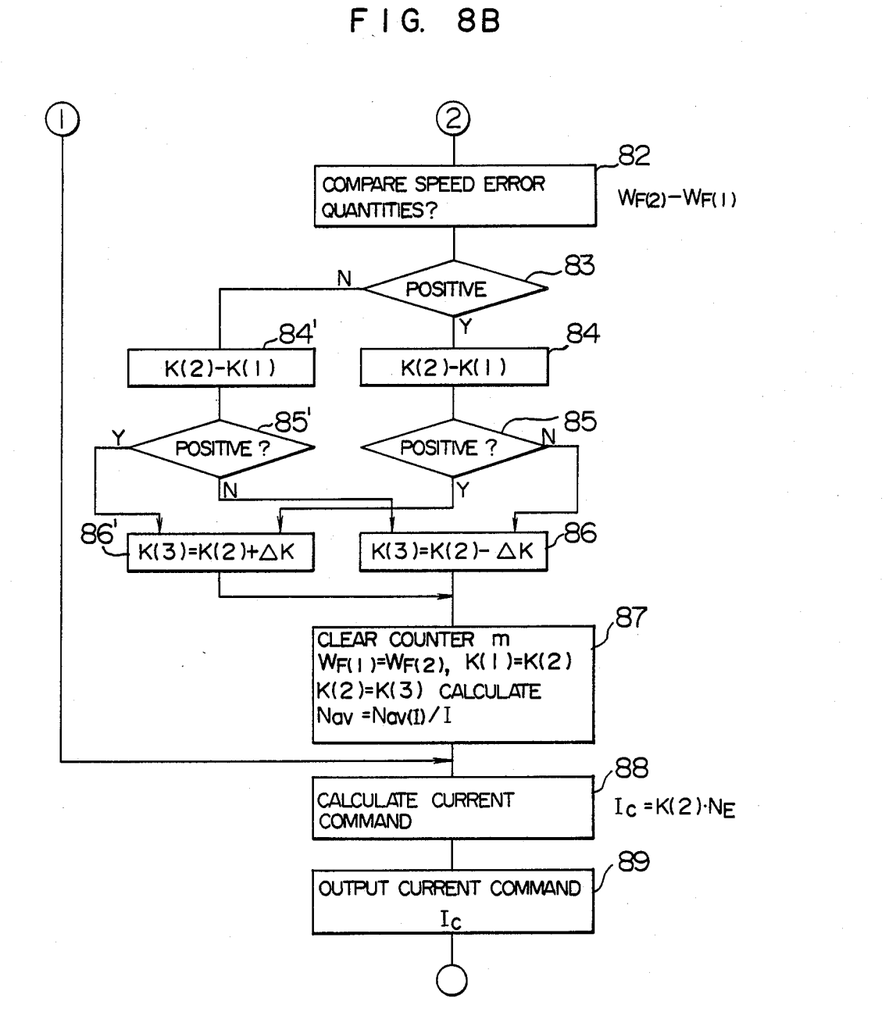

FIG. 8 is a flow chart illustrating the contents of processing of a microcomputer according to the method of the present invention, which shows an example that one speed control is performed at every pulse interval of the encoder 3 or an FG (frequency generator) in the same manner as that in the abovementioned embodiment.

That is, the microcomputer 7 fetches a speed command signal $N_s$ in a step 71, calculates a speed $N_f$ on the basis of a period $T_f$ of the encoder 3 in a step 72, calculates a speed error $N_E$ ($=N_s - N_f$) in a step 73, and calculates a speed error quantity $W_F$ expressed by the equation (3) and decides the gain K on the basis of the speed error quantity $W_F$ in steps 74 to 87. Then, the microcomputer 7 multiples the gain K by the speed error $N_E$ and outputs the obtained value as a current command in steps 88 and 89.

Here, the gain K is decided so as to perform operation at the point B in FIG. 7. That is, assuming that the quantity of change of the speed error quantity from its last value is $\Delta W_f$ and the quantity of change of the gain from its last value $\Delta K$, the decision of the gain value can be attained by setting the present gain K to K $\pm \Delta K$ depending on the sign of the $\Delta W_f$ as to whether it is negative or positive. Moreover, if the value of the $\Delta K$ is made to be a function of the $\Delta W_f$, the response can be made high.

Next, the steps 74 to 87 will be described. In the step 74, as an operation on the way of the calculation of a speed error quantity in accordance with the equation (3), $N_{avi}(n) = N_{avi}(n-1) + N_E - N_{av}$ is calculated at every pulse of the encoder 3, where n takes 1 to I. That is, on the basis of this equation, the calculation of $N_E(N \times (m-1) + n) - N_{av}$ in the equation (3) is performed, where n takes 1 to N, m takes 1 to M, $N_{av}$ is the last average value of I speed errors, and $N_{avi}(0)$ is set to zero in advance. Further, in order to obtain the average of the present speed errors required for the next operation of gain, the calculation of $N_{av}(i) = N_{av}(i-1) + N_E$ is also performed, where i takes 1 to I, and $N_{av}(0)$ is set to zero in advance. In the step 75, a counter is increased by one whenever the calculation of $N_{avi}(n)$ is performed, and in the step 76, it is judged whether the calculation of $N_{avi}(n)$ has been performed N-times or not. If it is proved that the number of times of the calculation has not reached N, in the steps 88 and 89, the calculation of a current command by a proportional term and the output of the current command to the automatic current regulator 5 are performed at the timing at every encoder pulse on the basis of the gain $K_1$ set in the last time. If it is proved that the counter n has reached N in the step 76, the initialization (clear) of the counter n is performed, and in the step 78, the calculation $W_{NE}(m) = W_{NE}(m-1) + |N_{avi}(N)/N|$ is performed, where m takes 1 to M, and $W_{NE}(0)$ is set to zero. That is, in this step 78, as calculation on the ways for obtaining the speed error quantity $W_F(2)$ with respect to I speed errors, calculation is made so that absolute values of average values $N_{avi}(N)/N$ of the sum $N_{avi}(N)$ of $N_E-N_{av}$ with respect to the N speed errors obtained in the step 74 are summed with each other M-times. In the step 79, a counter m is increased by one whenever the calculation of $W_{NE}(m)$ is performed in the step 78. In the step 80, it is judged whether the calculation of $W_{ME}(m)$ has been performed M-times or not. If it is proved that the number of times of the calculation has not reached M, the calculation of a current command by a proportional term is performed and the resulting current command is supplied to the automatic current regulator 5 at the timing at every encoder pulse on the basis of the gain $K_1$ set in the last time, in the steps 88 and 89. If it is proved that the number of times of the calculation has reached M, on the other hand, the present speed error quantity $W_F(2)$ is calculated in the step 81 by taking the average value of $W_{NE}(M)$. The present speed error quantity $W_F(2)$ is compared with its last value $W_F(1)$ in the step 82, and the same judgment as that in the first embodiment is performed in the steps 83 to 86. The steps 83 to 86 and 84' to 86' correspond to the steps 58 to 61 and 59' to 61' in FIG. 8 respectively, and therefore their description is omitted. The counter m is cleared, and processing required for the next calculation of speed error quantity, that is, the calculation of the average $N_{av}$ on the basis of the accumulated value $N_{avi}(N)$ of $|N_E|$ obtained in the step 74, and the storing thereof, the storing of $W_F(2)$, K(2) and K(3) as $W_F(1)$, K(1) and K(2), and so on are performed in the step 87.

Thus, on the basis of the flow shown in FIG. 8, it is possible to perform operation with the smallest speed error quantity shown at the point B in FIG. 7.

Figure 9:
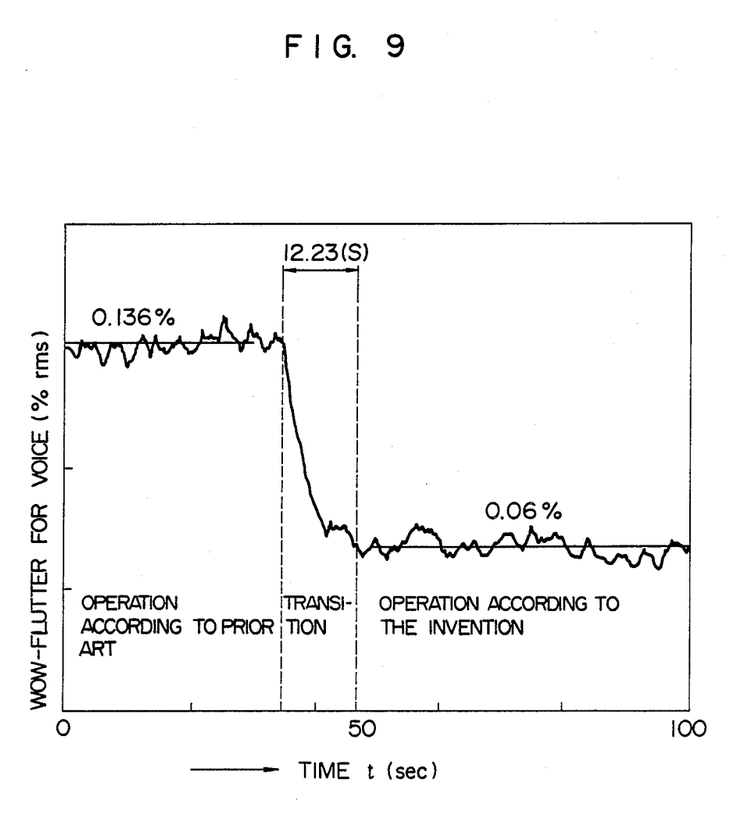
FIG. 9 is a diagram illustrating a result of test for confirmation of the effect of the embodiment of FIG. 8 by use of a VTR set.

FIG. 9 shows a result of examination in the case where the effect by this embodiment is confirmed by using a VTR set, that is, FIG. 9 shows an example in which voice wow and flutter of 3 kHz important to the VTR could be improved by application of the present invention.

Although the aforementioned embodiments have shown the case where a method of averaging speed errors is used for removing a high-frequency component, it is a matter of course that the invention is not limited to the specific embodiments and that the object of the invention can be also attained by removing such a high-frequency component in a digital manner.

Although FIG. 7 shows the case where attention is paid to a low-frequency component, it is to be understood that the same characteristic can be attained in the case where attention is paid to a high-frequency component, and that, in such a case, the point B can be defined as a point in which the quantity of a high-frequency component reaches the value C. In short, the speed error quantity can be controlled to be kept constant by adjusting the gain so suitably that the quantity of a high-frequency component becomes the value C.

Although the first and second embodiments have shown the case where proportional control is used, the invention is applicable to controlling apparatus having proportional, integral and differential control systems. In the case where the invention is applied to controlling apparatus having proportional, integral and differential control systems, minimum irregular rotation can e obtained by selectively changing the respective gains of the proportional, integral, differential systems to minimize the speed error quantity.

Figure 10:
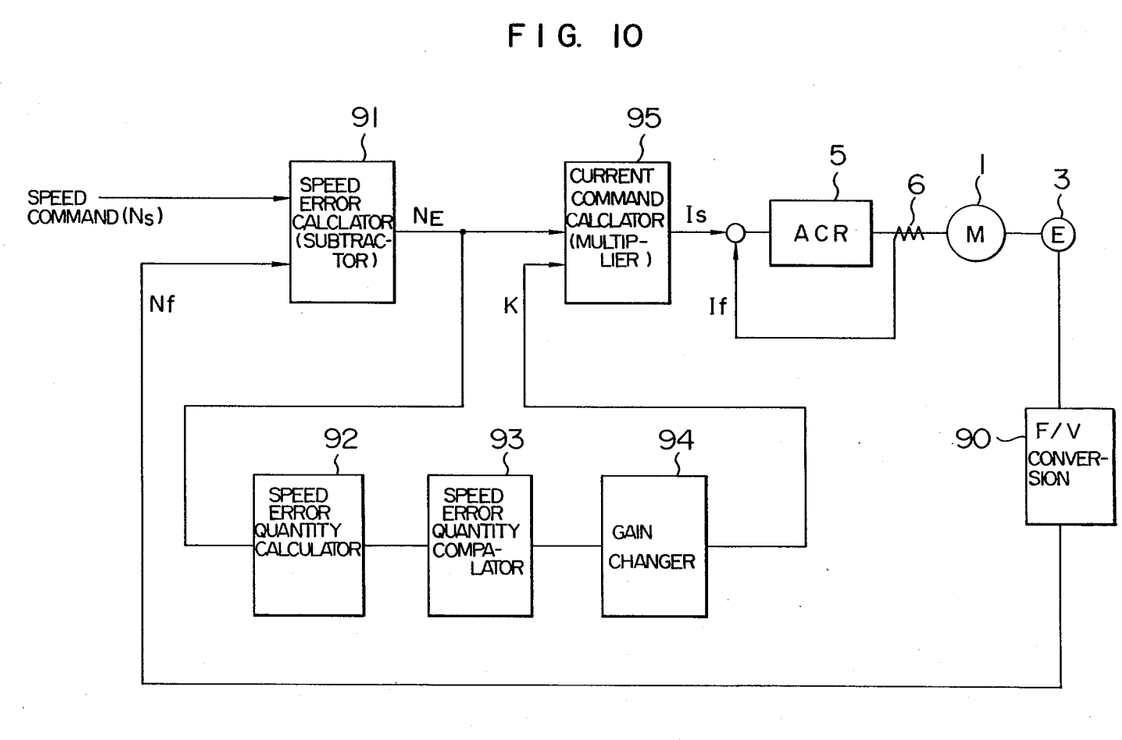
FIG. 10 is a diagram illustrating another embodiment of the present invention.

FIG. 10 is a block diagram showing an embodiment in which the present invention is realized by a hardware configuration. The driver or inverter is not shown in FIG. 10. Referring to FIG. 10, this embodiment will be described hereunder.

Reference numeral 90 represents an F/V converter for converting the output pulse of the encoder 3 into the measured rotating speed $N_f$ of the motor 1. Reference numeral 91 represents a speed error calculator for calculating a speed error $N_E$ by subtracting the measured speed $N_f$ from the speed command $N_s$ given from the outside. Reference numeral 92 represents a speed error quantity calculator for performing an arithmetic operation to calculate the average of speed error quantities for every predetermined number of encoder pulses according to the equations (1) and (3) and the like, on the basis of the output signal $N_E$ obtained from the speed error calculator 91. Reference numeral 93 represents a speed error quantity comparator for comparing the present speed error quantity with the last current speed error quantity in response to the output of the speed error quantity calculator 92 to thereby judge whether the speed error quantity has been increased or not. Reference numeral 94 represents a gain changer which is connected to the speed error quantity comparator 93 so as to correct or update the control gain on the basis of both the result of comparison of the speed error quantities and the process of gain change, corresponding to the processing performed in the steps 58 to 61 of FIG. 6 and in the 83 to 86 of FIG. 8. Reference numeral 95 represents a current command calculator for calculating a current command value $I_s$ on the basis of the speed error $N_E$ and the gain K in response to the output signals of the speed error calculator 91 and the gain changer 94 to thereby send out the current command value $I_s$. Because the means for calculating a current error $I_e$ from the current instruction value $I_s$ and the current detection value $I_f$, the automatic current regulator 5 and the current transformer 6 are the same as shown in FIGS. 1 and 3, they are not shown in FIG. 10.

As described above, according to the present invention, the irregular rotation of a moving body can be reduced by changing the speed control gain in accordance with the magnitude of the speed error quantity. The invention has therefore an effect that an apparatus of controlling the speed of a motor as a moving body suitably used in compact disk (CD) players, laser disk (LD) players, VTRs and the like which require a high-degree constant speed can be provided. Furthermore, the invention is applicable to linear-type motors.

We claim:

1. A method of controlling the speed of a moving body comprising the steps of:
   detecting the speed of said moving body successively;
   calculating a speed error which is a difference between a speed command value and the obtained speed detection value, whenever the speed of said moving body is detected;
   controlling successively the speed of said moving body on the basis of a driving signal obtained by an arithmetic operation on the basis of the speed error and a set control gain;
   calculating a speed error quantity on the basis of the obtained speed errors, whenever the detection of the speed of said moving body has been carried out a predetermined number of times;

comparing the speed error quantity obtained presently with the speed error quantity obtained last; and correcting the set control gain in accordance with the result of comparison in the comparing step.

2. A method of controlling the speed of a moving body according to claim 1, in which said predetermined number of times is at least two.

3. A method of controlling the speed of a moving body according to claim 1, in which said speed error quantity is an average value of variations of the speed errors, each of which variations is defined as a value obtained by subtracting an average value of said predetermined number of times of preceding speed errors from the speed error obtained currently.

4. A method of controlling the speed of a moving body according to claim 1, in which said control gain is initialized to a value smaller than a value which minimizes said speed error quantity prior to start of the speed control on said moving body.

5. A method of controlling the speed of a moving body according to claim 1, in which said speed error quantity is calculated on the basis of a desired component of variation contained in said speed error.

6. A method of controlling the speed of a moving body according to claim 5, in which said moving body is a brushless motor, and in which said desired component of variation includes a component of a switching frequency or a cogging torque frequency of said brushless motor.

7. A method of controlling the speed of a moving body according to claim 1, further comprising the step of returning said gain to a predetermined one when a value of variation of said speed error quantity or a value of said speed error quantity exceeds a predetermined value.

8. A method of controlling the speed of a moving body according to claim 1, in which the step of correcting said gain includes the step of comparing the presently set gain with the last set gain to thereby correct the set gain on the basis of the result of error comparison and the result of gain comparison to minimize said speed error quantity.

9. A method of controlling the speed of a moving body comprising the steps of:

detecting the speed of said moving body successively;

calculating a speed error which is a difference between a speed command value and the obtained speed detection value, whenever the speed of said moving body is detected;

controlling the speed of said moving body on the basis of a driving signal obtained by an arithmetic operation on the basis of the speed error and a set control gain;

calculating a speed error quantity on the basis of the obtained speed errors, whenever the detection of the speed of said moving body has been carried out a predetermined number of times;

comparing the speed error quantity obtained presently with the speed error quantity obtained last;

correcting the set control gain in accordance with the result of comparison in the comparing step; and said step of calculating speed error quantity including the step of calculating said speed error quantity from the components of said speed errors from which DC components and predetermined frequency components have been removed.

10. A method of controlling the speed of a moving body according to claim 9, in which said predetermined frequency component is a component of a frequency which substantially exceeds one-tenth of the frequency for controlling the speed of said moving body.

11. A method of controlling the speed of a moving body according to claim 10, in which said speed error quantity is calculated in accordance with the following equation:

$$W_F = \frac{1}{M} \sum_{m=1}^{M} \left| \frac{1}{N} \sum_{n=1}^{N} N_{E(N \cdot (m-1)+n)} - N_{av} \right|$$

in which each of M and N represents a positive integer; M.N represents a period of calculation of the speed error quantity; $N_{E(N \cdot (m-1)+n)}$ represents the $\{N \cdot (m-1)+n\}$-th speed error; n is an integer of 1 to N; m is an integer of 1 to M; and $N_{av}$ represents the average speed error.

12. A method of controlling the speed of a moving body according to claim 9, in which said predetermined frequency component is a component of a frequency which substantially not higher than one-tenth of the frequency for controlling the speed of said moving body.

13. A method of controlling the speed of a moving body according to claim 9, in which the step of correcting the set gain includes the step of correcting the set gain on the basis of both the result of said speed error quantity comparison and the result of comparison between the presently set gain and the last set gain to thereby minimize the next speed error quantity.

14. A method of controlling the speed of a moving body according to claim 9, in which said speed control is a successive speed control and includes proportional control.

15. A method of controlling the speed of a motor comprising the steps of:

detecting the rotating speed of said motor successively;

calculating a speed error which is a difference between a speed command value and the obtained speed detection value, whenever the speed of said motor is detected;

controlling successively the speed of said motor on the basis of a driving signal obtained by an arithmetic operation on the basis of the speed error and a set control gain;

calculating a speed error quantity on the basis of the speed errors, whenever the detection of the speed of said motor has been carried out a predetermined number of times;

comparing the speed error quantity obtained presently with the speed error quantity obtained last; and correcting the set control gain in accordance with the result of comparison in the comparing step.

16. A method of controlling the speed of a motor according to claim 15, in which said predetermined number of times is at least two.

17. A method of controlling the speed of a motor according to claim 15, in which said speed error quantity is an average value of variations of the speed errors, each of the variations is defined as a value obtained by subtracting an average value of said predetermined number of times of preceding speed errors from the speed error obtained currently.

18. A method of controlling the speed of a motor according to claim 15, in which said control gain is initialized to a value smaller than a value which minimizes said speed error quantity.

19. A method of controlling the speed of a motor according to claim 15, in which said speed error quantity is calculated on the basis of a desired component of variation contained in said speed error.

20. A method of controlling the speed of a motor according to claim 19, in which said motor is a brushless motor, and in which said desired component of variation includes a component of a switching frequency or a cogging torque frequency of said brushless motor.

21. A method of controlling the speed of a motor according to claim 15, further comprising the step of returning said gain to a predetermined one when a value of variation of said speed error quantity or a value of said speed error quantity exceeds a predetermined value.

22. A method of controlling the speed of a motor according to claim 15, in which the step of correcting said gain includes the step of comparing the presently set gain with the last set gain to thereby correct the set gain on the basis of the result of error comparison and the result of gain comparison to minimize said speed error quantity.

23. A method of controlling the speed of a motor comprising the steps of:
detecting the rotating speed of said motor successively;
calculating a speed error which is a difference between a speed command value and the obtained speed detection value, whenever the speed of said motor is detected;
controlling successively the speed of said motor on the basis of a driving signal obtained by an arithmetic operation on the basis of the speed error and a set control gain;
calculating a speed error quantity on the basis of the obtained speed errors, whenever the detection of the speed of said motor has been carried out a predetermined number of times;
comparing the speed error quantity obtained presently with the speed error quantity obtained last;
correcting the set control gain in accordance with the result of comparison in the comparing step; and
said step of calculating speed error quantity including the step of calculating said speed error quantity from a component obtained by removing DC components and predetermined frequency components contained in said speed errors.

24. A method of controlling the speed of a motor according to claim 23, in which said predetermined frequency component is a component of a frequency which substantially exceeds one-tenth of the frequency for controlling the speed of said motor.

25. A method of controlling the speed of a motor according to claim 24, in which said speed error quantity is calculated in accordance with the following equation:

$$W_F = \frac{1}{M} \sum_{m=1}^{M} \left| \frac{1}{N} \sum_{n=1}^{N} N_{E(N \times (m-1)+n)} - N_{av} \right|$$

in which each of M and N represents a positive integer; M×n represents a period of calculation of the speed error quantity; $N_{E(N \times (m-1)+n)}$ represents the {N×(m−1)+n}th speed error; n is an integer of 1 to N; m is an integer of 1 to M; and $N_{av}$ represents the average speed error.

26. A method of controlling the speed of a motor according to claim 23, in which said predetermined frequency component is a component of a frequency which substantially not higher than one-tenth of the frequency for controlling the speed of said motor.

27. A method of controlling the speed of a motor according to claim 23, in which the step of correcting the set gain includes the step of correcting the set gain on the basis of both the result of said speed error quantity comparison and the result of comparison between the presently set gain and the last set gain to thereby minimize the next speed error quantity.

28. A method of controlling the speed of a motor according to claim 23, in which said successively speed control includes proportional control.

29. An apparatus for controlling the speed of a moving body, which comprises:
means for successively detecting the speed of said moving body so as to send out the detected value as a detection speed value;
means for successively calculating a difference between a command speed value and said detection speed value so as to send out the difference as a speed error;
means for calculating a speed error quantity on the basis of the speed errors obtained a predetermined number of times whenever the speed errors have been obtained said predtermined number of times;
means for comparing the presently obtained speed error quantity with the last obtained speed error quantity;
means for changing a control gain on the basis of the result of said speed error quantity comparison;
means for generating a command signal on the basis of both said speed error and said control gain; and
means for driving said moving body in accordance with said command signal.

30. An apparatus for controlling the speed of a moving body according to claim 29, in which said means for changing said control gain includes means for comparing the present current control gain with the last control gain to thereby correct said control gain on the basis of the result of said speed error quantity comparison and the result of said control gain comparison.

31. An apparatus for controlling the speed of a moving body according to claim 29, in which said predetermined number is at least two.

32. An apparatus for controlling the speed of a moving body according to claim 29, in which said speed error quantity is an average value of variations of the speed errors, each of which variations is defined as a value obtained by subtracting an average value of said predetermined number of times of preceding speed errors from the speed error obtained currently.

33. An apparatus for controlling the speed of a moving body according to claim 29, in which said control gain is initialized to a value smaller than a value which minimizes said speed error quantity prior to start of the speed control on said moving body.

34. An apparatus for controlling the speed of a moving body according to claim 29, in which said speed error quantity is calculated on the basis of a desired component of variation contained in said speed error.

35. An apparatus for controlling the speed of a moving body, which comprises:

means for successively detecting the speed of said moving body so as to send out the detected value as a detection speed value;

means for successively calculating a difference between an command speed value and said detection speed value so as to send out the difference as a speed error;

means for calculating a speed error quantity on the basis of speed errors obtained a predetermined number of times whenever the speed errors have been obtained said predetermined number of times;

means for comparing the presently obtained speed error quantity with the last obtained speed error quantity;

means for changing a control gain on the basis of the result of said speed error quantity comparison;

means for generating a command signal on the basis of both said speed error and said control gain;

means for driving said moving body in accordance with said command signal; and said error quantity calculating means including means for removing DC components and predetermined frequency components from said speed errors, so that said speed error quantity is calculated from said speed errors from which said DC components and said predetermined frequency components are removed.

36. An apparatus for controlling the speed of a moving body according to claim 35, in which said means for changing said control gain includes means for comparing the presently set control gain with the last set control gain, so that said control gain is changed on the basis of the result of said speed error comparison and the result of said control gain comparison to thereby minimize said speed error quantity.

37. An apparatus for controlling the speed of a moving body according to claim 36, in which said predetermined frequency component contains frequencies substantially exceeding one-tenth of the frequency for controlling the speed of said moving body.

38. An apparatus for controlling the speed of a motor comprising:
means for successively detecting the speed of said motor so as to send out the detected value as a detection speed value;

means for successively calculating a difference between an command speed value and said detection speed value so as to send out the difference as a speed error;

means for calculating a speed error quantity on the basis of the speed errors obtained a predetermined number of times whenever the speed errors have been obtained said predetermined number of times;

means for comparing the presently obtained speed error quantity with the last obtained speed error quantity;

means for changing a control gain on the basis of the result of said speed error quantity comparison;

means for generating a command signal on the basis of both said speed error and said control gain; and means for driving said motor in accordance with said command signal.

39. An apparatus for controlling the speed of a motor according to claim 38, in which said means for changing said control gain includes means for comparing the present control gain with the last control gain to thereby correct said control gain on the basis of the result of said speed error quantity comparison and the result of said control gain comparison.

40. An apparatus for controlling the speed of a motor according to claim 38, in which said predetermined number of times is at least two.

41. An apparatus for controlling the speed of a motor according to claim 38, in which said speed error quantity is an average value of variations of the speed errors, each of which variations is defined as a value obtained by subtracting an average value of said predetermined number of times of preceding speed errors from the speed error obtained currently.

42. An apparatus for controlling the speed of a motor according to claim 38, in which said control gain is initialized to a value smaller than a value which minimizes said speed error quantity prior to start of the speed control on said motor.

43. An apparatus for controlling the speed of a motor according to claim 38, in which said speed error quantity is calculated on the basis of a desired component of variation contained in said speed error.

44. An apparatus for controlling the speed of a motor comprising:
means for successively detecting the speed of said motor so as to send out the detected value as a detection speed value;

means for successively calculating a difference between an command speed value and said detection speed value so as to send out the difference as a speed error;

means for calculating a speed error quantity on the basis of the speed errors obtained a predetermined number of times whenever the speed errors have been obtained said predetermined number of times;

means for comparing the presently obtained speed error quantity with the last obtained speed error quantity;

means for changing a control gain on the basis of the result of said speed error quantity comparison;

means for generating a command signal on the basis of both said speed error and said control gain;

means for driving said motor in accordance with said command signal; and said error quantity calculating means including means for removing DC components and predetermined frequency components from said speed errors, so that said speed error quantity is calculated from said speed errors from which said DC components and said predetermined frequency components are removed.

45. An apparatus for controlling the speed of a motor according to claim 44, in which said means for changing said control gain includes means for comparing the presently set control gain with the last set control gain, so that said control gain is changed on the basis of the result of said speed error comparison and the result of said control gain comparison to thereby minimize said speed error quantity.

46. An apparatus for controlling the speed of a motor according to claim 45, in which said predetermined frequency component contains frequencies substantially exceeding one-tenth of the frequency for controlling the speed of said motor.

* * * * *